(12) United States Patent
Oliveri et al.

(10) Patent No.: US 11,093,975 B2
(45) Date of Patent: Aug. 17, 2021

(54) INTEGRATED LOCATION-BASED MESSAGE PERSONALIZATION

(71) Applicant: CARS.COM, LLC, Chicago, IL (US)

(72) Inventors: Joe Oliveri, Chicago, IL (US); Ben Stark, Chicago, IL (US); Anthony Arguelles, Chicago, IL (US); Balaaji Parthasarathy, Chicago, IL (US); Crispina Chong, Chicago, IL (US); Joe Grosspietch, Chicago, IL (US); Michael Dehner, Chicago, IL (US); Roger Kurth, Chicago, IL (US); Jim Cissell, Chicago, IL (US); Sainaga Srikantham, Chicago, IL (US); Mike Costa, Chicago, IL (US); Larry Vance, Chicago, IL (US)

(73) Assignee: CARS.COM, LLC, Chicago, IL (US)

( * ) Notice: Subject to any disclaimer, the term of this patent is extended or adjusted under 35 U.S.C. 154(b) by 540 days.

(21) Appl. No.: 15/823,333

(22) Filed: Nov. 27, 2017

(65) Prior Publication Data

US 2019/0164194 A1 May 30, 2019

(51) Int. Cl.
*G06Q 30/02* (2012.01)
*H04W 4/18* (2009.01)
*H04W 4/021* (2018.01)

(52) U.S. Cl.
CPC ..... *G06Q 30/0271* (2013.01); *G06Q 30/0261* (2013.01); *G06Q 30/0267* (2013.01); *H04W 4/021* (2013.01); *H04W 4/185* (2013.01)

(58) Field of Classification Search
CPC ........... G06Q 30/0271; G06Q 30/0261; G06Q 30/0267; H04W 4/021; H04W 4/185
See application file for complete search history.

(56) References Cited

U.S. PATENT DOCUMENTS 9,686,646 B1 * 6/2017 Pecard .................... G01S 19/13
2008/0091537 A1 * 4/2008 Miller .............. G08G 1/096741
705/14.53

(Continued)

OTHER PUBLICATIONS

Loren Baker, "Marketer's Guide to Geo Targeting, Beacons and Proximity", available on Nov. 11, 2015, retrieved from https://smallbiztrends.com/2015/11/guide-to-geo-targeting-beacons-proximity.html (Year: 2015).*

*Primary Examiner* — Sam Refai
(74) *Attorney, Agent, or Firm* — Marshall, Gerstein & Borun LLP

(57) ABSTRACT

Systems and methods for personalizing electronic messages for users based upon determining user mobile device location data indicating user locations within an area of interest are disclosed. User geospatial location data is obtained at user mobile devices upon the triggering event of a user action (e.g., visiting a web site or using an application on the user mobile device). The location data is stored and compared against map data accurately and precisely defining a map area of the area of interest, such as a vehicle dealer lot. A user data sheet is generated to store information regarding the user location and time at the area of interest. The user data sheet may include a user status identifier based upon elapsed time since the user was at the area of interest. Personalized messages are then generated and transmitted to the user based upon the information in the user data sheet.

13 Claims, 6 Drawing Sheets

(56) References Cited

U.S. PATENT DOCUMENTS

| | | | |
|---|---|---|---|
| 2011/0231265 A1* | 9/2011 | Brown | G06Q 30/0277 |
| | | | 705/14.73 |
| 2013/0252633 A1* | 9/2013 | Liang | G06Q 30/0261 |
| | | | 455/456.1 |
| 2016/0078095 A1* | 3/2016 | Man | H04W 4/02 |
| | | | 707/689 |

* cited by examiner

US 11,093,975 B2

INTEGRATED LOCATION-BASED MESSAGE PERSONALIZATION

TECHNICAL FIELD

The present disclosure generally relates to systems and methods for generating personalized messages based upon user locations.

BACKGROUND

With the spread of mobile data access through smartphones and similar devices, mobile device users who visit locations frequently search information regarding such locations or other complementary or competing locations while actually at a location. This new type of data provides opportunities to customize visitor experiences or to predict visitor behavior. Geospatial location data is routinely generated by mobile devices using various terrestrial and satellite methods, such as cellular network tower triangulation, wireless node identification, or Global Positioning System (GPS) location determination techniques. These techniques can vary significantly in their accuracy, with GPS techniques usually providing the greatest degree of accuracy but consuming the most power.

A variety of computer-implemented mapping techniques have been developed to plot geospatial coordinates against known landmarks on electronic maps. These techniques typically define a location by a point coordinate and a radius, such that any observed geospatial location data within a circular area around the point coordinate are considered to be at the location. Very few areas of interest in the world are actually circular, however, resulting in false positives or false negatives when determining whether an observed geospatial location from a mobile device is at the location. In some situations, a low degree of accuracy is sufficient, such as where visitors are unlikely to be near the location for other purposes. For example, a shopping mall surrounded by a large parking lot on all sides may be adequately described by a point coordinate and radius because any mobile device users in the parking lot may be assumed to be at such location in order to visit the shopping mall. In situations where mobile device users may be near the area of interest for unrelated reasons or where competing locations may be in close proximity, it becomes useful to distinguish between actual visitors to the area of interest and other mobile device users who are merely nearby. Comparing mobile device geospatial location data against point coordinates based upon simple distance measurements is insufficient for such situations.

Additionally, various techniques for selection and transmission of communications to users of computers or smartphones have been developed, but these techniques have been limited in their ability to personalize messages to users. Conventional methods of message personalization rely upon extensive data regarding a user, generally requiring the user to create a user account and provide information. Many users avoid creating such user accounts due to the time required or privacy concerns, which problem is particularly acute for infrequent consumer transactions such as shopping for a vehicle. Alternate conventional methods include using cookies to track user online actions, but such tracking of online actions of users often produces low-quality data with significant noise from irrelevant user actions. Additionally, many users and end-user applications limit the use of such techniques due to privacy concerns. Therefore, improved techniques for user message personalization are desirable.

SUMMARY

The present application discloses a method, system, and computer-readable medium storing instructions for generating personalized messages for users based upon mobile device geospatial location data indicating a user is located within an area of interest, such as a vehicle dealer lot. Such geospatial location data is compared with known information regarding areas of interest to identify relevant information to include in a message to the user, such as types of vehicles associated with the vehicle dealer lot where the user is located. A user data sheet may be generated to store a user mobile device indicator and a timestamp associated with user location at the area of interest, without requiring a user to create or log into a user account. One or more personalized messages may be generated and presented to the user across one or more user sessions of accessing a web site or using a mobile application on the user mobile device. Such personalized messages may distinguish between users currently at the area of interest, recently at the area of interest, or within a relevant period after being at the area of interest. To further improve accuracy of message personalization, in some embodiments, the geospatial location data may be compared with a polygonal area representing the area of interest to distinguish between locations on or merely near a vehicle dealer lot, as well as sections of a vehicle dealer lot associated with particular types of vehicles.

In one aspect, the method, system, or instructions may include: accessing information associated with one or more vehicles or vehicle dealers at a user mobile device via a communication network; obtaining a geospatial location identifier indicating a geospatial location of the user mobile device in response to accessing the information using a geolocation unit of the user mobile device; transmitting the geospatial location identifier and a user mobile device identifier to a server; accessing map data associated with a vehicle dealer lot in proximity to the identified geospatial location of the user mobile device; determining that the user mobile device is located on the vehicle dealer lot by comparing the geospatial location identifier with the map data; determining a vehicle type associated with a user interest based upon the vehicle dealer lot; generating a user data sheet at the server; determining a message content for presentation to a user of the user mobile device based upon the user data sheet; transmitting an electronic message including the message content from the server to the mobile user device via the communication network; and/or presenting the message content to the user by a display of the user mobile device.

In another aspect, the method, system, or instructions may: provide information associated with one or more vehicles or vehicle dealers to a user mobile device in response to a data request from the user mobile device via a communication network; cause the user mobile device to obtain and transmit via the communication network a geospatial location identifier indicating a geospatial location of the user mobile device, which geospatial location identifier may be generated by the mobile device; receive the geospatial location identifier and a user mobile device identifier from the user mobile device via the communication network; access map data associated with a vehicle dealer lot in proximity to the identified geospatial location of the user mobile device; determine that the user mobile device is located on the vehicle dealer lot by comparing the geospatial location identifier with the map data; determine a vehicle type associated with a user interest based upon the vehicle dealer lot; generate a user data sheet; determine a message content for presentation to a user of the user mobile device based upon the user data sheet; transmit an electronic message including the message content to the user mobile device via the communication network; and/or cause the user mobile device to present the message content to the user via a display of the user mobile device.

The map data may include a set of data defining a lot area of the vehicle dealer lot as one or more polygons within a map area, such that determining that the user mobile device is located on the vehicle dealer lot may include comparing the geospatial location identifier with the lot area. In some embodiments, such map data may further be used to determine the user mobile device is located in a section of the vehicle dealer lot based upon the one or more polygons within the map area, such that determining the vehicle type may include determining one or more types of vehicles associated with the section of the vehicle dealer lot.

The user data sheet may include (i) a timestamp associated with the geospatial location identifier, (ii) the user mobile device identifier, and/or (iii) the vehicle type. The user data sheet may further include a user status identifier indicating a category of user status based upon time elapsed since a time indicated by the timestamp, such that determining the message content may include determining the message content based at least in part upon the user status identifier. In further embodiments, the server may determine a time elapsed since the time indicated by the timestamp has exceeded a first threshold duration, at which point the server may update the user status identifier to indicate a second category of user status based upon the time elapsed since the time indicated by the timestamp being determined to have exceeded the first threshold duration. In yet further embodiments, the server may further determine the time elapsed since the time indicated by the timestamp has exceeded a second threshold longer than the first threshold duration, at which point the server may further update the user status identifier to indicate a third category of user status based upon the time elapsed since the time indicated by the timestamp being determined to have exceeded the second threshold duration. Such third user category may indicate an inactive status, which inactive status may be applied to users not determined to have been located at a vehicle dealer lot.

Determining the message content based upon the user data sheet may include identifying a vehicle of the vehicle type located at the vehicle dealer lot or an associated vehicle dealer lot. In some embodiments, the information accessed at the user mobile device may be associated with a second vehicle type, in which case the user data sheet may further include a user interest identifier indicating interest of the user in the second vehicle type determined based upon the information accessed at the user mobile device. In such embodiments, determining the message content may include determining the message content based at least in part upon the user interest identifier.

In some embodiments, the method, system, or instructions may operate across multiple user sessions associated with use of a mobile application or web site. Thus, the information associated with the one or more vehicles or vehicle dealers may be accessed at the user mobile device during a first user session, and the user data sheet may be generated prior to a second user session (either during or after the first user session). The message content may be determined during the second user session based in part upon the user mobile device identifier. In some embodiments, the message content may be determined without accessing user account information associated with the user. Also during the second user session, the electronic message including the message content may be transmitted from the server to the user mobile device.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

The invention described herein relates to methods and systems that generate personalized messages for users of mobile devices, such as smartphones. In accordance with the following embodiments, geospatial location data regarding the location of the mobile device may be generated and sent to a server. The server may access map data indicating relevant areas of interest (such as vehicle dealer lots) in proximity to the location of the mobile device, then determine whether the mobile device is located within one of the areas of interest. In preferred embodiments, the server may user polygon map data representing the area of interest to accurately determine whether the mobile device is within the area of interest, rather than being merely near the area of interest. When the server determines the mobile device is located within an area of interest, the server may further generate a user data sheet storing information about the area of interest and the mobile device. The user data sheet may storing information such as a user mobile device identifier for identifying the mobile device, a type of vehicle associated with the area of interest, and a timestamp associated with a time the mobile device was located within the area of interest. Such timestamp may be used to further determine a user status identifier to indicate how recently the user was at the area of interest, which may be used to personalize messages sent to the user. The server may be configured to send an electronic message to the user at a later time, such as in response to a subsequent user request for information from the server (e.g., a request by the mobile device for a web page provided by the server). At such point, the server may identify the user data sheet based upon the user mobile device identifier, without requiring access to information from a user account or user profile. Thus, the server may generate personalized electronic messages to send to the user without requiring the user to create or log into a user account. Such messages are personalized for the user, but they are based upon information associated with the user only indirectly through the mobile device. These techniques thereby improve the quality and usefulness of electronic messages sent to users who do not have user accounts associated with the server by linking.

Figure 1:
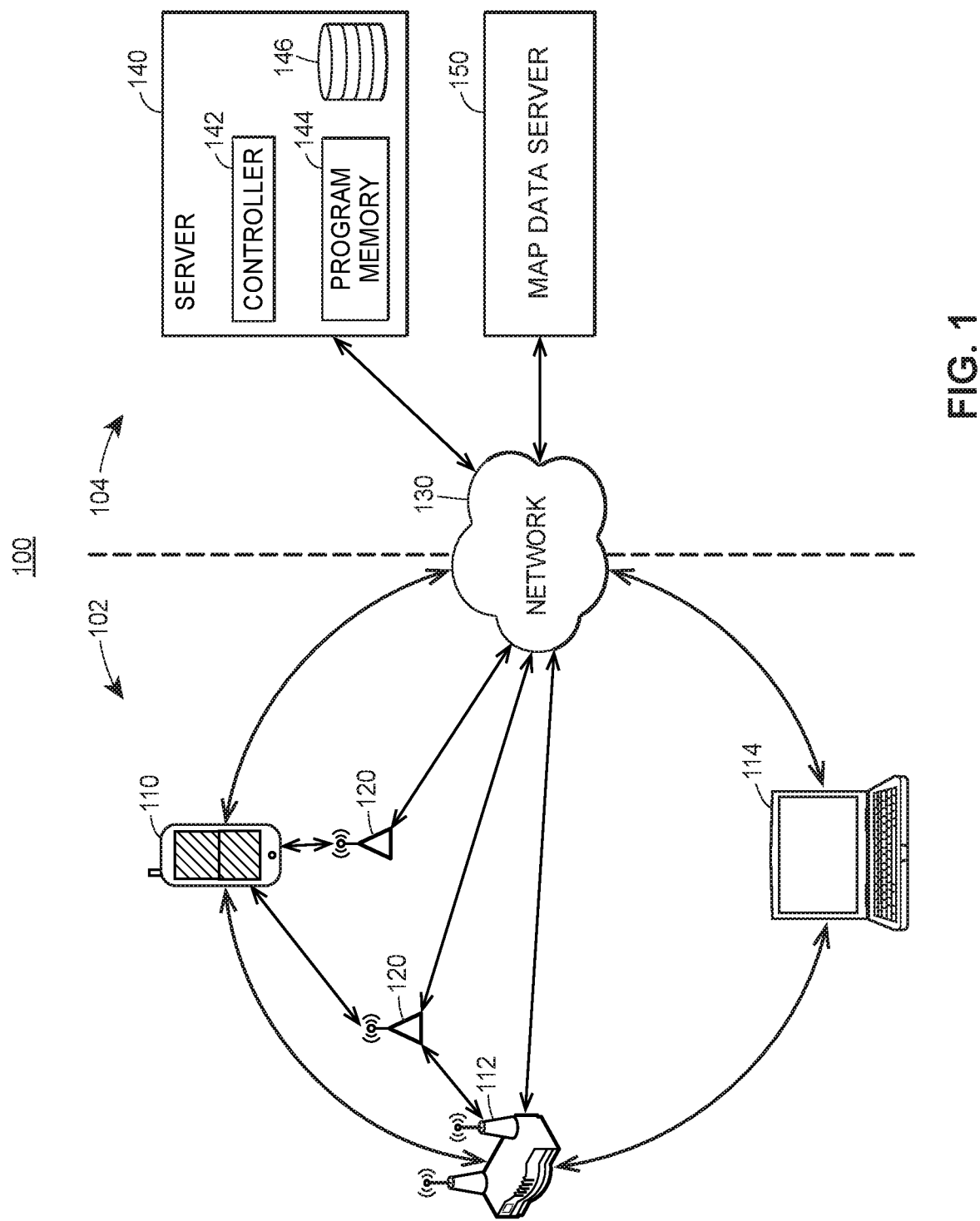
FIG. 1 illustrates a block diagram of an exemplary data system on which the methods described herein may operate in accordance with the embodiments described herein.

FIG. 1 illustrates a block diagram of an exemplary data system 100. The high-level architecture includes both hardware and software applications, as well as various data communications channels for communicating data between the various hardware and software components. The data system 100 may be roughly divided into front-end components 102 and back-end components 104. The front-end components 102 may communicate via a network 130 with the back-end components 104, as well as with other front-end components 102. For example, the front-end components 102 may include a plurality of computing systems communicatively connected to the back-end components 104 via the network 130. As illustrated, the computing systems may include a mobile computing device 110 (e.g., a smartphone of a customer) associated with a user and a computing device 114 (e.g., a desktop computer, notebook, or tablet computer), which may be associated with the user or with another entity, such as a vehicle dealer. The mobile computing device 110 may be used by a user to request and obtain data using one or more software programs, such as information regarding vehicles or vehicle dealers. The mobile computing device 110 may be configured to determine an absolute or relative geospatial location of the user by one or more location determination modules, as described further elsewhere herein. In some embodiments, the mobile computing device 110 may communicate with one or more routers 112 or beacons 120 to exchange data or determine a geospatial location of the mobile computing device 110. The computing device 114 may be used by an operator to request and review data from the server 140, which may include data collected from one or more mobile computing devices 110. The computing device 114 may similarly be used by an operator to analyze user locations or interactions with server data, or to provide message data for messages to be sent to users (along with criteria for sending such messages, for example specific vehicle advertisements). Although one mobile computing device 110 and one computing device 114 are shown, it should be understood that the data system 100 may include a plurality of each or either (e.g., hundreds or thousands of such devices). Any of the front-end components 102 may be directly or indirectly (e.g., through a router 112) connected to the network 130. In some embodiments, the one or more mobile computing devices 110 may be communicatively connected to the computing device 114 through the router 112, without communication through the network 130.

The back-end components 104 may operate in coordination with the front-end components 102 to collect, analyze, and present information. To this end, the back-end components 104 may include a server 140 that stores information received from the front-end components 102 via the network 130. The server 140 may further generate maps or other report data based upon location and other data from the front-end components 104, particularly data received from mobile computing devices 110. The server 140 may likewise generate and transmit messages to user computing devices 110 based upon information received from the user computing devices 110, which may be stored in user data sheets in a program memory 144 or database 146 of the server 140. In some embodiments, the back-end components 104 may include one or more map data servers 150, which may provide map data to the server 140. The map server 150 may be a third-party server operated by an entity separate from the entity operating the server 140, which may supply map data to the server 140 periodically or upon receiving a request for map data from the server 140. The server 140 may include a controller 142 to process data and run software programs, applications, or routines stored in a program memory 144, and the server 140 may further include or be communicatively connected to a database 146 for data storage and retrieval.

The front-end components 102 may be arranged in various configurations including varying components depending upon the desired scope of tracking and reporting. In preferred embodiments, the front-end components 104 may include one or more mobile computing devices 110 configured to access information via the network 130 and to determine geospatial locations of the devices. In an exemplary embodiment described in detail herein, the front-end components 102 and back-end components 104 may be used to facilitate a vehicle research and purchase process for users. Correspondingly, the components may be used to generate personalized messages for users based upon current or previous user locations, as determined based upon locations determined by user computing devices 110. Additionally or alternatively, the components may be used to provide information to vehicle dealers regarding user visits, research, and indications of interest in specific vehicles or types of vehicles. Each of these mobile computing devices 110 may request data regarding vehicles or vehicle dealers through a general-purpose or special-purpose software application running on the device, such as from a web browser, a data service application, or a messaging application (e.g., via an automated or live communication session). The mobile computing devices 110 may obtain the data via the network 130 from the server 140, which server 140 may store information regarding the requests. The server 140 may further acquire and store information regarding the users' locations, as determined by the mobile computing devices 110. Such information regarding user geospatial location may be associated with users, information requests, or other activities. The location and additional information may be processed by the server 140 to generate personalized messages for users. Such messages may be then be transmitted to the user computing devices 110. Additional front-end components 102 (i.e., routers 112 or beacons 120) may be included to facilitate location determination or to provide information to the users' mobile computing devices 110.

In various embodiments, the mobile computing device 110 may be any known or later-developed dedicated-use or general-use mobile personal computer, cellular phone, smartphone, tablet computer, or wearable computing device (e.g., a watch, glasses, etc.), having one or more modules or units for determining the location of the mobile computing device 110. In a preferred embodiment, the mobile computing device 110 may be a general use smartphone or tablet computer with a Global Positioning System (GPS) receiver. In some embodiments, the mobile computing device 110 may be a thin client device, wherein much or all of the computing processes are performed by the server 140 (except those processes directly involved in data input, communication, or data presentation), with information communicated between the thin client mobile computing device 110 and the server 140 via the network 130. The mobile computing device 110 may include any number of internal components and may be further communicatively connected to one or more external components by any known wired or wireless means (e.g., USB cables, Bluetooth communication, etc.). Because of the energy demands associated with use of the mobile computing device 110 and its associated components in determining geospatial location, it may be advantageous in some embodiments to limit location determination. Such limitations may include causing the device to determine location only upon the occurrence of a triggering action (such as a request to access data regarding a vehicle or vehicle dealer) or causing the device to determine location no more frequently than a specified rate (e.g., 0.1 seconds, 10 seconds, 1 minute, 5 minutes, etc.). User settings on the mobile computing device 110 may also limit the type or frequency of location determinations by the device. The mobile computing device 110 is further discussed below with respect to FIG. 2.

One or more routers 112 may be included within the data system 100 to facilitate communication or geospatial location determination. The routers 112 may be any wired, wireless, or combination wired/wireless routers using any known or here-after developed communication protocol for general- or special-purpose computer communication. In some embodiments, the geospatial locations of one or more routers 112 may be determined and utilized to determine the geospatial location of the mobile computing devices 110 based upon signal strength, such as by triangulation. In some embodiments, the mobile computing devices 110 or computing devices 114 may be communicatively connected to the network 130 via one or more routers 112.

Additionally, or alternatively, the data system 100 may include one or more beacons 120 configured to communicate wirelessly with mobile computing devices 110. Such beacons 120 may be placed at known locations, or locations of the beacons 120 may be determined following placement. Once operational, the beacons may communicate with the mobile computing devices 110 to provide location or other information. For example, a vehicle dealer lot may contain a plurality of beacons 120 associated with a plurality of sections of the lot, which beacons 120 may transmit their identities using low-power transmission modes. Upon receiving such low-power transmissions, a mobile computing device 110 may record the identity of one or more beacons 120 or may determine a location based thereupon. As a further example, the mobile computing device 110 may determine its location based upon signal strength or another indication of proximity to one or more beacons 120. If the beacons 120 transmit geospatial location data, the mobile computing device 110 may further communicate such data to the server 140 or may determine a geospatial location of the mobile computing device 110 from the received beacon location data. Wireless communication may occur by any known means, such as Bluetooth, Wi-Fi, or other appropriate radio-frequency or other communications protocols.

The front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 include one or more servers 140 and may further include one or more map data servers 150. Each server 140 may include one or more computer processors within the controller 142 adapted and configured to execute various software applications and routines of the data system 100 stored in the program memory 144, in addition to other software applications. The controller 142 may include one or more processors (not shown), a random-access memory (RAM) (not shown), the program memory 144, and an input/output (I/O) circuit (not shown), all of which may be interconnected via an address/data bus (not shown). The RAM and program memory 144 may be implemented as semiconductor memories, magnetically readable memories, optically readable memories, or any other type of memory known or hereafter developed. The server 140 may further include one or more databases 146, which may be adapted to store geospatial location and other data received from the front-end components 102, as well as vehicle or vehicle dealer information. Such data might include, for example, information regarding vehicles listed for sale by vehicle dealers, information regarding averages for vehicles of specified types, makes, models, or years, information regarding vehicle dealer inventory, hours, or customer ratings, or other related information. The server 140 may access data stored in the database 146 when executing various functions and tasks associated with the data system 100, including when providing data to a user computing device 110 upon receiving a request for data from the mobile computing device 110.

Figure 2:
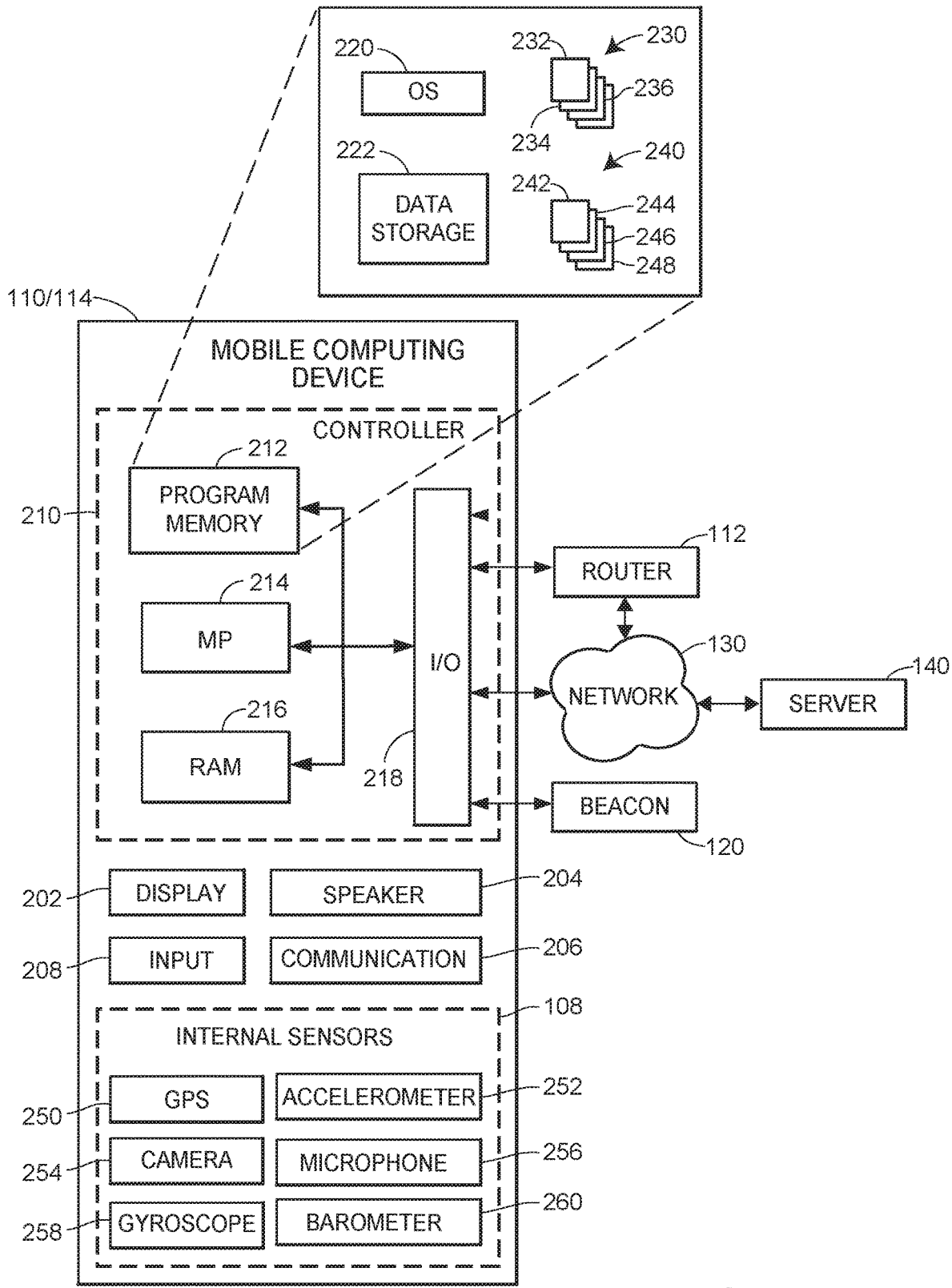
FIG. 2 illustrates a block diagram of an exemplary mobile computing device in accordance with the embodiments described herein.

FIG. 2 illustrates a block diagram of an exemplary mobile computing device 110 or computing device 114 in accordance with the data system 100. Because the computing device 114 may be a mobile device or a desktop computer having additional or fewer components than the mobile computing device 110, the following description refers to the mobile computing device 110. It should be understood, however, that any combination of features described herein with respect to the mobile computing device 110 may be included in the computing device 114.

The mobile computing device 110 may be a smartphone, a tablet computer, or similar mobile device capable of receiving and processing electronic information. The mobile computing device 110 may include one or more internal sensors 108, which may provide sensor data regarding the local physical environment or the device's location therein. Additionally, the mobile computing device may receive additional data from one or more external beacons 120 or from one or more routers 112. The data may be processed by the controller 210 to perform various operations for the user. Additionally, or alternatively, the data may be sent to one or more processors of the server 140 through the network 130 for processing. When the controller 210 (or other processor) receives an indication of a user action or request, appropriate responses are determined and implemented. Such responses may include processing data for presentation to the user, requesting data from the server 140, processing data from other front-end components 102 or back end components 104, determining a geospatial location of the mobile computing device 110, sending data to the server 140, or presenting information to the user via a display 202 or speaker 204. In some embodiments, the mobile computing device 110 may include a communication unit 206 to send or receive information from local or remote devices (e.g., computing device 114 or server 140), either directly or through the network 130. The communication unit 206 may include a wireless communication transceiver, such as a Wi-Fi or Bluetooth communication component. Further embodiments of the mobile computing device 110 may include one or more inputs 208 to receive instructions, selections, or other information from a user of the mobile computing device 110.

The mobile computing device 110 may include various input and output components, units, or devices. The display 202 and speaker 204, along with other integrated or communicatively connected output devices (not shown), may be used to present information to the user of the mobile computing device 110 or others. The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component, which may include a haptic component or device. In some embodiments, communicatively connected speakers 204 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touchscreen or otherwise be configured to receive input from a user, in which case the display 202 and the input 208 may be combined.

The mobile computing device 110 may further include various internal sensors 108. In some embodiments, additional data may be received from external beacons 120 communicatively connected to the mobile computing device 110, either directly or through the network 130. The internal sensors 108 may include any devices or components mentioned herein, other extant or later-developed devices suitable for monitoring a physical environment (including device position or location within the environment). The sensors of the mobile computing device 110 may further include additional internal sensors 108 specifically configured for determining location, such as geolocation, movement tracking, or spatial orientation of the device.

Although discussion of all possible sensors of the mobile computing device 110 would be impractical, if not impossible, several sensors warrant particular discussion. Disposed within the mobile computing device 110, the internal sensors 108 may include a GPS unit 250, an accelerometer 252, a camera 254, a microphone 256, a gyroscope 258, or a barometer 260. Any or all of these may be used to generate sensor data related to the device's geospatial location, user activity, or other relevant information. Additionally, other types of currently available or later-developed sensors may be included in some embodiments.

The GPS unit 250, the accelerometer 252, and the gyroscope 258 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots.

The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods. Similarly, the gyroscope 258 may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes 258 or other types of movement-detecting sensors may be used in various embodiments. In some embodiments, one or more accelerometers 252 or gyroscopes 258 may be disposed within a wearable device associated with a user, such that the sensor data therefrom may indicate movement of the user. Such sensor data may further be used to determine relative movements of the user to better track location over time. For example, movement data may be used to determine the length of time a user spends at a particular location, such as examining a vehicle on a vehicle dealer lot.

The camera 254 may be used to capture images of vehicles or other relevant objects in the user's environment. It should be understood that one or more cameras 254 may be disposed within the mobile computing device 110 and configured to generate either still images or video recordings. It should further be understood that many smartphones or tablet computers include front and back solid state digital cameras, which may be used to simultaneously obtain images of a large portion of the area before and behind the phone or tablet. In some embodiments, the camera 254 may include a flash or lighting device to illuminate the subject area. The microphone 256 may be used to monitor sounds within the local physical environment 106. One or more microphones 256 may be disposed within the mobile computing device 110 or may be communicatively connected thereto. The one or more microphones 256 may be used to record sounds or to receive voice commands from a user. The barometer 260 may likewise be used to detect changes in atmospheric pressure within the local physical environment of the mobile computing device 110. Such barometers 260 may include MEMS barometers disposed within a smartphone or tablet.

The mobile computing device 110 may also communicate with the router 112, the beacons 120, or the network 130 using the communication unit 206, which may manage communication between the controller 210 and external devices. The communication unit 206 may transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, or other output from the controller 210 to one or more of the router 112, the beacons 120, the network 130, or the server 140.

The mobile computing device 110 may further include a controller 210. The controller 210 may receive, process, produce, transmit, and store data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAM 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memories 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the mobile computing device 110. Moreover, in thin-client implementations, additional processing and data storage may be provided by the server 140 via the network 130.

The software applications 230 and routines 240 may include computer-readable instructions that cause the processor 214 to implement location, processing, and communication functions. Thus, the software applications 230 may include a vehicle information application 232 to obtain and present information regarding vehicles and vehicle dealers, a web browser application 234 to obtain and present web-based content, and a mapping application 236 to present visual maps based upon user parameters. The software routines 240 may support the software applications 230 and may include routines such as a location routine 242 to determine a location of the mobile computing device 110 from GPS or other data, a communication routine 244 for communicating with the server 140 via the network 130, a data request routine 246 to allow a user to specify parameters for requesting data, and a data presentation routine 248 for generating or presenting received data to the user via the display 202. It should be understood that additional or alternative applications 230 or routines 240 may be included in the program memory 212, including other applications of the sort ordinarily stored on a mobile devices.

In some embodiments, the mobile computing device 110 may include a wearable computing device or may be communicatively connected to a wearable computing device. In such embodiments, part or all of the functions and capabilities of the mobile computing device 110 may be performed by or disposed within the wearable computing device. Additionally, or alternatively, the wearable computing device may supplement or complement the mobile computing device 110. For example, the wearable computing device 110 may be a smart watch with a display 202, a speaker 204 (or haptic alert unit), an input 208, and one or more internal sensors 108, such as a GPS unit 250. Such smart watch may be communicatively connected to a smartphone and used interchangeably with the smartphone for some purposes (e.g., displaying information, providing user alerts, etc.).

The data system 100 described above and illustrated in FIGS. 1-2 may be used to perform the location determination and personalized message generation methods discussed further below. Together, the methods described below relate to generating personalized messages for users based upon locations associated with user interaction with a mobile device. Specifically, the methods involve capturing user geolocation data, which may be generated when a user accesses vehicle-related information via the mobile computing device 110. The user location data or data related to it (e.g., a timestamp or type of vehicle associated with the user geolocation data) may be determined and stored in a user data sheet stored in the program memory 144 or database 146 of the server 140. For example, a vehicle type of interest to the user may be determined based upon an association of such vehicle type with a vehicle dealer lot at which the mobile computing device 110 is determined to have been located based upon a comparison the user geospatial location data from the mobile computing device 110 with map data indicating the location of the vehicle dealer lot obtained from the map data server 150. Based upon the data stored in the user data sheet, message content personalized for the user may be determined and used to generate an electronic message, which may then be transmitted to the mobile computing device 110 and presented to the user via the display 202. Although the methods are described with reference to vehicles and vehicle dealers, the methods may be applied to other situations in which users may interact with mobile devices to obtain information at various locations associated with the objects to which the information relates.

Figure 3:
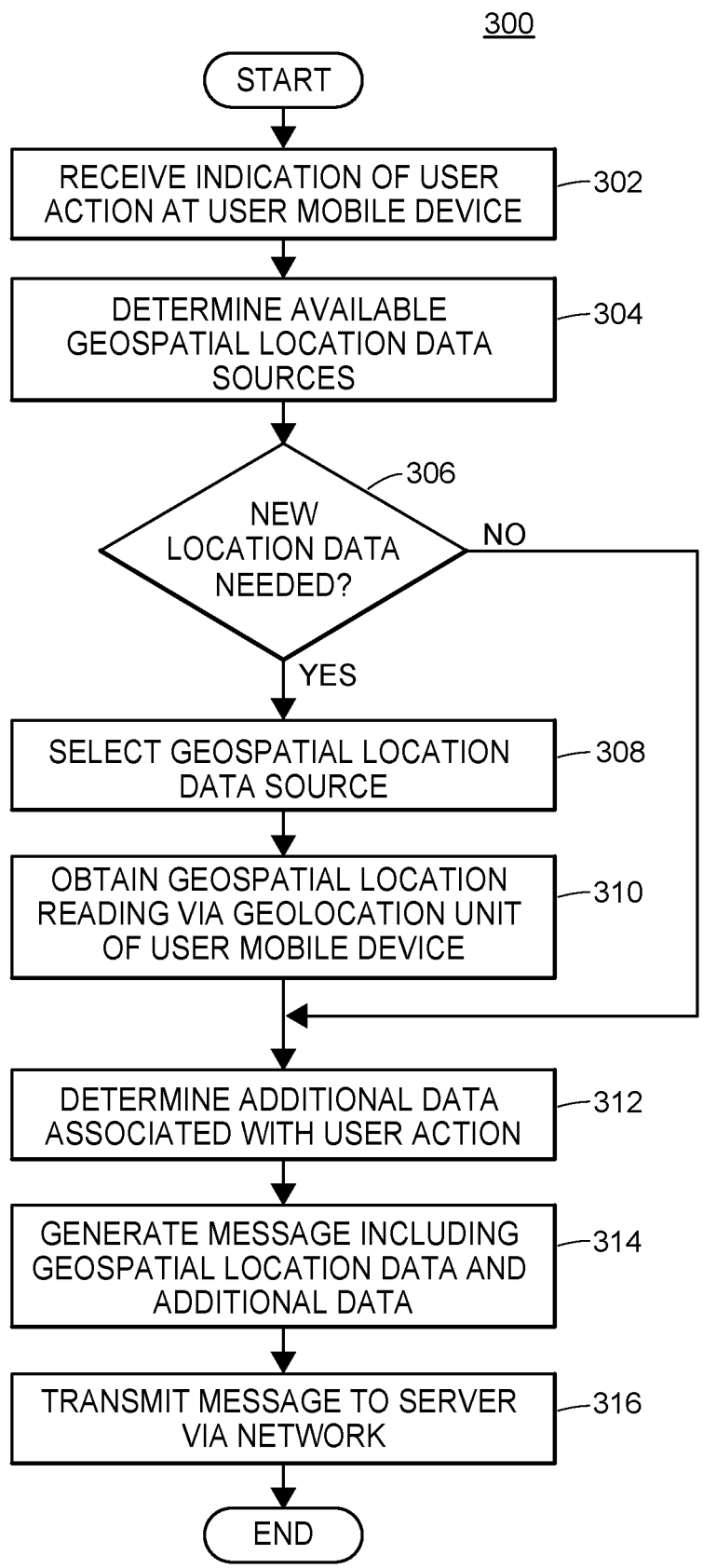
FIG. 3 illustrates a flow diagram of an exemplary location determination method in accordance with the embodiments described herein.

FIG. 3 illustrates a flow diagram of an exemplary location determination method 300 for determining the location of a user mobile device, such as a mobile computing device 110. Once the location is determined by the user mobile device, location data may be communicated to a remote server, such as a server 140, via a network, such as the network 130. In addition to location data, additional data associated with user interaction with the user mobile device may be likewise determined and communicated to the remote server. The remote server may store and process the location and additional data to generate personalized messages for the user, as discussed further below. The method 300 may be implemented by one or more software applications, such as the vehicle information application 232 or the location routine 242, controlling the user mobile device, based upon settings of the application or general settings of the mobile device.

The method 300 may begin upon receipt of an indication of a user action at the user mobile device (block 302). In response to receiving the indication, the user mobile device may determine the available geospatial location data sources that may be used by the software application to determine the device location of the user mobile device (block 304). The user mobile device may then determine whether new location data is needed (block 306), and may take appropriate actions. When a new location is needed, the user mobile device may select a geospatial location data source (block 308) and obtain a geospatial location reading via a geolocation unit (such as the GPS unit 250) of the user mobile device (block 310). Once sufficient location data has been obtained, the user mobile device may further determine additional data associated with the user or the user's interactions with the user mobile device (block 312). Such additional data may include information regarding data requested by the user regarding vehicles or vehicle dealers. The user mobile device may then generate a message to the remote server including the location data and any additional data (block 314) and transmit the message to the remote server via a network (block 316). In some embodiments, the exemplary method 300 may be modified to include alternative, additional, or fewer actions.

At block 302, the user mobile device may receive an indication of a user action that serves as a triggering event for determining location. The triggering event may be either internal or external to the user mobile device, as well as being either a manual request from the user or an automatically generated indication of an action. As an example, the user action may include interacting with the user mobile device to start a software application that provides information regarding vehicles or vehicle dealers. Alternatively, the user action may include requesting or otherwise accessing information regarding a vehicle, type of vehicle, or vehicle dealer (e.g., by searching for an item or selecting an item displayed while browsing similar items). As a particular example, the user mobile device may receive the indication of a user action from the remote server via the network when the user interacts with a web browser application on the user mobile device to request vehicle or vehicle dealer information from the remote server. For example, the remote server may include an indication of the user action as instructions to determine a user location when providing information to the user mobile device. Upon the occurrence of a user action, the user mobile device may generate an indication associated with the user action to trigger location determination. For example, a routine or process running within a software application or running in the background on the user mobile device may automatically generate the indication upon the occurrence of a user interacting with an application to request, retrieve, or view data related to a specific vehicle, a type of vehicle, or a vehicle dealer. Such routine or process may monitor the user's interaction with the user mobile device or other actions that may serve as triggering events. Such non-interaction user actions may include transporting the user mobile device to a location of particular interest, such as by the user visiting an area at or near a vehicle dealer lot (i.e., being located on or within a radius of specified distance from a point representing a location). The routine or process may monitor the user's location passively based upon geospatial location data generated by the mobile computing device for other purposes, or the routine or process may monitor the user's location actively by controlling the user mobile device to obtain geospatial location data. Once the indication of user action is generated, a software application or routine of the user mobile device may then receive the generated indication of the user action, which may further cause the application or routine to determine the geospatial location of the user mobile device.

At block 304, the user mobile device may determine one or more sources of geospatial location data available for determining the device's location. This determination may include a determination of the capabilities of the user mobile device, the receipt and strength of broadcast signals needed for location determination, power requirements of the data source or limitations of the device, processing requirements of the data source or time limitations for the determination, general device settings concerning location services, or settings specific to an application or routine concerning location services. For example, the user mobile device may have settings limiting the use of GPS location by applications running on the device because of the large amount of power used by the GPS unit 250. General or specific device settings may also allow or restrict communication with cellular data towers, such as through activation or deactivation of an "airplane mode" of the device. As another example, the user mobile device may be configured to determine location by comparison of signal strength from known locations of wireless routers 112 or by proximity to beacons 120, which may only be available to determine location if the user mobile device is in proximity to such routers or beacons. Other factors that may impact signal strength may also influence whether a geospatial location data source is considered to be available, such as electromagnetic interference or shielding, loss of line of sight to GPS satellites, severe weather, power outages, etc. In any event, the user mobile device may determine a source is unavailable if device settings prohibit use at the time or if the received strength of a necessary signal used in the determination is insufficient to determine the location of the user mobile device with a predetermined accuracy. In some embodiments, the user mobile device may determine availability of the data source based upon the accuracy of the location determination by the device under prevailing environmental conditions. In further embodiments, the availability of geospatial location data sources may include the availability of recent location data for the user mobile device, such as recently determined locations of the device (e.g., within the preceding minute, half-minute, second, 0.1 seconds, etc.). Such recent location data may include location data identified by the user mobile device for any purpose, include locations determined for use by other applications running on the device.

At block 306, the user mobile device may determine whether new location data for the device is needed. As noted above, the user mobile device may have recently determined its geospatial location. Such recent location data may have been generated by the device upon the receipt of a previous indication of a user action. For example, the user may browse through a plurality of pages displaying vehicle information for a plurality of vehicles in quick succession. Because it is unlikely that the user mobile device would have traveled a significant distance between these successive actions, new location data may not be needed. Alternatively, the user mobile device may have determined its location for an unrelated purpose shortly before the user action. For example, a user may have viewed a map on the user mobile device immediately prior to requesting information regarding a vehicle dealer, which may have caused the device to determine its location. An application or routine running on the user mobile device may determine whether new location data is needed based upon the existence and sufficiency of one or more recently determined locations. Location data may be determined to be sufficiently recent if it was determined within a predetermined period of time prior to the user action (e.g., five minutes, one minute, ten seconds, one second, etc.), which period may depend upon device settings, a type of the user action, or other factors. Location data may be determined to be sufficiently accurate if it meets a predetermined accuracy threshold (e.g., ten meters, five meters, etc.) or if it is as accurate as the accuracy expected from a new location determination using the available data sources. In some embodiments, the sufficiency of the recent location data may depend upon a combination of time and accuracy. If sufficiently accurate and sufficiently recent location data exists for the user mobile device, the user mobile device may determine that new location data is not needed, thus the method 300 may continue with the determination of additional data at block 312. If no sufficiently accurate and sufficiently recent location data exists for the user mobile device, the user mobile device may determine that new location data is needed, thus the method 300 may continue with the selection of a data source at block 308.

At block 308, the user mobile device may select one or more of the available geospatial data sources to use in determining the location of the device. The selection may be made based upon a comparison of location accuracy or precision levels of the sources and location accuracy or precision requirements associated with the eventual use of the geospatial location data. Location accuracy and precision may be determined by known techniques based upon a probability of the determined location of the device being within a distance of the actual location of the device, which may be expressed as a radius (e.g., 5 meters, 10 meters, etc.) associated with a confidence level (e.g., 95% confidence, 90% confidence). The selection may additionally or alternatively be made based upon power usage levels associated with location determination using the available sources. In some embodiments, the selection may include a plurality of data sources that may be combined to determine the geospatial location of the device with greater accuracy or precision than the individual sources alone. In further embodiments, a plurality of geospatial data sources may be sequentially selected to attempt to obtain geospatial location data with sufficient accuracy. Accuracy may be determined as a property of the data source in some instances. In preferred embodiments, the user mobile device attempts to select a data source with an accuracy of thirty meters or better (i.e., where the radius associated with applicable confident level is no larger than thirty meters). In further embodiments, the user mobile device attempts to select a data source with an accuracy of ten meters or better. Once the one or more geospatial data sources are selected, the user mobile device may use the selected sources to determine the device's location.

At block 310, the user mobile device may determine the device's location by obtaining one or more geospatial location readings using the one or more geospatial data sources. In some embodiments, the user mobile device may obtain the geospatial location readings via a geolocation unit within the device, such as the GPS unit 250 of the mobile computing device 110. The geolocation unit or processor of the user mobile device may further process the obtained geospatial location readings (i.e., signals transmitted by a geospatial data source or information derived therefrom) to determine the geospatial location of the device. Such processing may include performing one or more sets of calculations, algorithmically evaluating the geospatial location readings, or selecting one or more values from lookup tables to generate geospatial location data indicating the location of the user mobile device based upon the obtained geospatial location readings. As an example, an antenna of the GPS unit 250 may obtain geospatial location readings from a plurality of GPS transmitter satellites, which may then be processed by the GPS unit 250 to calculate the device location based upon differences in the received signals. In some embodiments, obtaining the geospatial location data may include obtaining user permission to generate or transmit geolocation data, such as when a web site using HTML 5 requests geolocation data. In further embodiments, determining the location of the user mobile device may include generating geospatial location data in a prescribed format utilizing a predetermined geographic coordinate system, which may be a different format or system than the native output of the geolocation unit. The geospatial location data may further include or be associated with a timestamp or indicator of the user mobile device or user thereof.

At block 312, in some embodiments, the mobile user device may further determine additional data associated with the user action or the state of the user mobile device. Such additional data may include a user identifier (e.g., user account ID, device ID, etc.), an indication of a user interaction with the user mobile device (e.g., user-initiated search parameters, page views, user selection of an option to save or send data, application use, etc.), or an indication of a user action other than an interaction with the user mobile device (e.g., change in user location, previous user interaction with another computing device, etc.). Such additional data is not dependent upon the user creating or logging into an account, however, as the additional data may be associated with the mobile user device, which may serve as a proxy for the user without directly collecting any information about the user. The additional data may be directly or indirectly indicative of a user intention or interest in taking the user action that caused the user mobile device to determine its location. For example, a user shopping for a car may access a vehicle detail page (VDP) or dealer profile page (DPP) within a web browser or software application running on the user mobile device in order to obtain information regarding the vehicle or dealer. This additional information may be useful in determining the user's interest in certain types of vehicles. If the user is logged in to an account, information about previous VDP or DPP views may be retrieved, or the user may select an option to save information regarding a vehicle for future review. In further embodiments of the same example, information regarding a user selection of an option to contact a dealer (e.g., via telephone, e-mail, or chat) may be of particular value as indicating a strong user interest in a specific vehicle. Additional information may similarly include details regarding the user's interaction with the user mobile device or other actions, such as time spent viewing a page, number of related pages viewed, time spent at a location, photographs taken at a location, searches performed at a location, or pages viewed at a location. Such data may be useful in combination with the user mobile device location data to understand the user's intent or purpose. For example, the user may coincidentally happen to be near a vehicle dealer lot while searching for vehicles, or the user may have previously searched vehicles at the lot and spent time on the lot comparing vehicles using the user mobile device.

At block 314, the user mobile device may generate a message including the geospatial location data and additional data determined as described above. The message may be formatted for efficient transmission by removing redundant or extraneous information. In some embodiments, the message may sanitize the data to remove information that identifies the user. In such embodiments, the message may include only non-identifying data that may be used for generating reports presenting statistical data regarding a plurality of users. In some such embodiments, the message may include additional data regarding previous user activity, which may be retrieved by the user mobile device from a remote server and included in the message without identifying information. In such manner, the message may include information associated with a user account over a period of time, while not including information identifying the user. Alternatively, the message may include a user mobile device identifier identifying a particular mobile computing device 110, rather than identifying the user of the user mobile device. Once generated, the message may be stored in a memory of the user mobile device or may be transmitted to a remote server. If stored at the user mobile device, further supplemental data may be later added to the message prior to transmission to the remote server, which supplemental data may be determined in the same manner as described herein regarding method 300. In some embodiments, multiple messages may be generated to include data regarding multiple locations or multiple user actions.

At block 316, the user mobile device may transmit the one or more generated messages to the remote server via the network. The user mobile device may communicate with the remote server to send the one or more messages via a communication unit 206 using any convenient protocol. As noted above, the user mobile device may hold the messages for communication to the sever at a time removed from the time of the location determination. The messages may be held until the user mobile device is connected to a high-bandwidth or unmetered communication connection, such as a WiFi connection, to avoid network congestion or avoid data charges. The user mobile device may similarly delay communicating the messages to the remote server until the user is determined to have completed a session of interaction with the device or has left a location. For example, the messages may be transmitted when the user closes a software application, navigates away from a web site, or remains inactive for a period of time (e.g., ten minutes, thirty minutes, etc.). Once the one or more messages have been transmitted to the remote server, the data method 300 may end. The remote server may then store and process the received data as described herein, either immediately or at a later time. The data method 300 may be implemented again upon the occurrence of another user action that serves as a triggering event.

Figure 4:
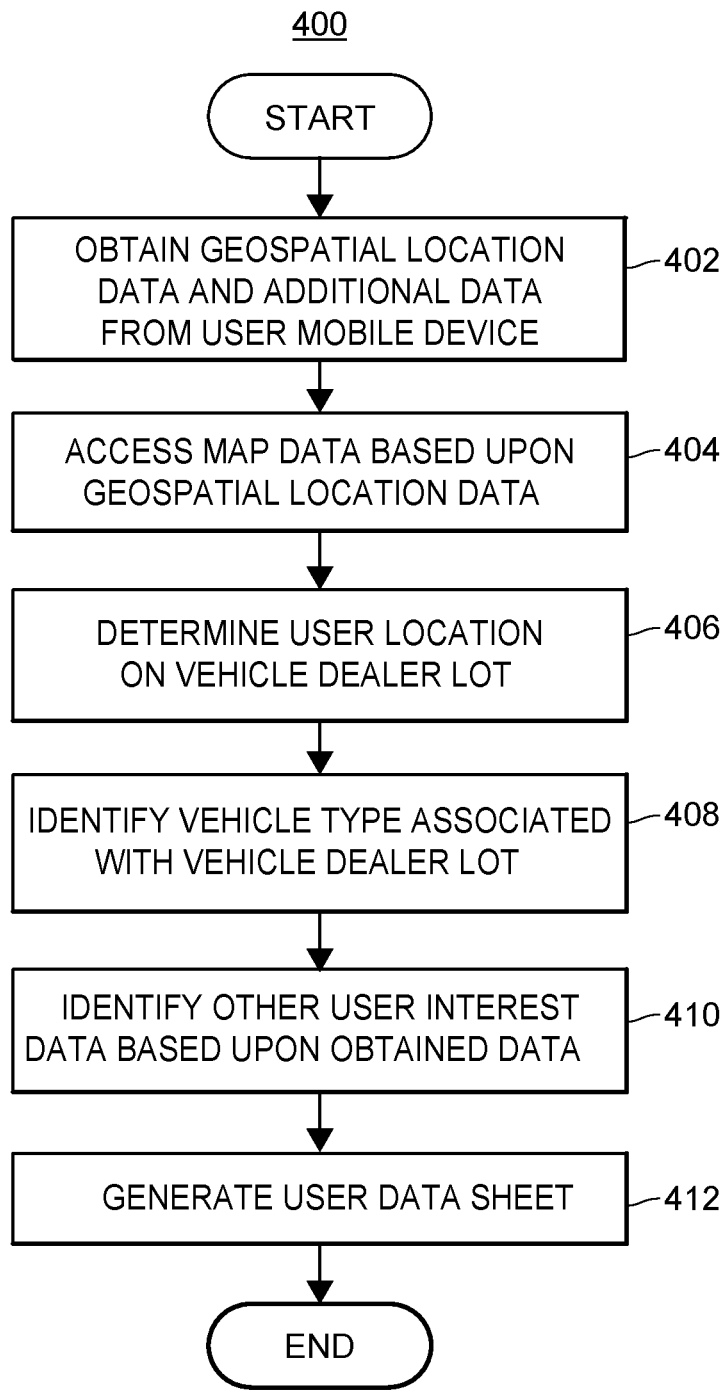
FIG. 4 illustrates a flow diagram of an exemplary user data sheet generation method for generating a user data sheet containing information regarding the user's location and interests.

FIG. 4 illustrates a flow diagram of an exemplary user data sheet generation method 400 for generating a user data sheet containing information regarding the user's location and interests. Such user data sheet may be associated with the user mobile device and used to generate personalized electronic messages for the user, as discussed further below. In some embodiments, the user data sheet may not be directly associated with the user, instead being associated with the user mobile device (which is assumed to be associated with the user). For example, the user data sheet may include a user mobile device identifier in order to generate user-personalized message content based upon the association between the user mobile device and the user of such device. The exemplary method 400 may be implemented by one or more remote servers (i.e., servers 140) based upon information obtained from user mobile devices (i.e., mobile computing devices 110).

The user data sheet generation method 400 may begin with obtaining geospatial location data and additional data from the user mobile device (block 402). Map data may be accessed (block 404) and used to determine a user location of a vehicle dealer lot (block 406). A vehicle type associated with the vehicle dealer lot may then be determined (block 408), and other user interest data may be identified based upon the data obtained from the user mobile device (block 410). Such vehicle type and other user interest data may then be used to generate a user data sheet (block 412) for further use in generating personalized electronic messages for the user.

At block 402, the remote server may obtain geospatial location data and additional data determined from the user mobile device, as described above. The user geospatial location data and any additional data may be received by the remote server as messages transmitted from the user mobile device. In some embodiments, the data may be received in response to a request by the remote server for such data, which request may cause the user mobile device to generate and transmit one or more messages containing the data. For example, the remote server may request data from the user mobile device when providing information associated with vehicles or vehicle dealers to the user mobile device, such as via a web browser or software application of the user mobile device accessing data stored on the remote server (e.g., viewing a web page or querying a database via the remote server). The remote server may request specific data or may specify data parameters, such as by specifying a minimum location accuracy or a maximum age of the location data.

The geospatial location data may include a geospatial location identifier generated by the user mobile device that indicates a user geospatial location. Such geospatial location identifier may include GPS coordinates to indicate a location of the user mobile device associated with the user. In addition to the geospatial location data, the remote server may obtain additional data regarding the interaction of the user with the user mobile device. Such additional information may include information regarding vehicles or vehicle dealers viewed or searched by the user. Such vehicles or vehicle dealers may be distinct from a vehicle dealer lot at which the user is currently located (or types of vehicles associated with such vehicle dealer lot). For example, the user may search vehicles or competitor lots or compare vehicles produces by different manufacturers or sold under different brands. In some embodiments, the remote server may obtain the additional data in one or more data requests by the user mobile device for information accessible to the remote server (e.g., data regarding vehicle dealers stored in the database 146). The additional data may further include a time associated with the geospatial location data or other additional data, which time may be used to determine a timestamp associated with the user data sheet, as discussed further below. In some embodiments, the additional information may include information regarding a duration of a user on a vehicle dealer lot, a duration of a user viewing information associated with vehicles or vehicle dealers, or other durational data. In additional embodiments, the additional data may include information regarding a user account (e.g., an associated e-mail address or residence address). Alternatively, the additional data may be obtained without reference to a user account, and even without the user having created or logged into a user account associated with vehicles or vehicle dealers. In further embodiments, the remote server may obtain part or all of the additional data from a source other than the user mobile device, or the remote server may determine part or all of the additional data from a request by the user mobile device. For example, the remote server may determine user interactions with the user mobile device based upon data the user mobile device accesses or requests from the remote server.

At block 404, the remote server may access map data based upon the geospatial location data. The remote server may access the map data by querying a map database associated with the remote server or by requesting the map data from another server, which may include a map data server 150 associated with a third-party map data provider. In some embodiments, the remote server may obtain map data from multiple map data sources, such as a general map data source (e.g., a source providing road data, major landmarks, etc.) and a special-purpose map data source (e.g., a source providing data for a specific location, such as a vehicle dealer lot). In some embodiments, the special-purpose map data may include indications of locations associated with one or more vehicle dealer lots. In some embodiments, the special-purpose map data source may be a data source that provides polygon map data defining individual buildings, properties, stores, or business locations. Thus, the special-purpose map data source may be a data source that provides polygon map data defining one or more vehicle dealer lots, including lots in proximity to the user geospatial location. Such polygon map data may include a set of coordinates that define a polygon representing the physical boundaries (i.e., the map area footprint) of each vehicle dealer lot. In further embodiments, the polygon map data may further include sub-polygons associated with areas within the vehicle dealer lot (e.g., a showroom, an office, a section of a lot associated with a particular vehicle type, etc.). The general map data source and the special-purpose map data source may be the same source or may be a plurality of separate sources.

To avoid accessing excessive quantities of map data, the remote server may identify parameters for the map data, which may include an area around a user geospatial location indicated by a geospatial location identifier obtained from the user mobile device. In addition to defining an area of proximity of the user geospatial location, the parameters may also include information regarding relevant locations or features to be accessed. For example, relevant map locations or features may include locations of vehicle dealer lots in proximity to the user geospatial location. Such vehicle dealer lot location data may likewise be associated with information regarding such vehicle dealer lots (e.g., business names, addresses, hours, contract information, customer/vendor identifiers, etc.). The parameters may be used by the remote server to access map data for a relevant map area including the user geospatial location. In some embodiments, the remote server may access relevant polygon map data within the map area, such as a set of data defining a lot area of a vehicle dealer lot (or a section thereof) as one or more polygons within the map area. In further embodiments, such polygon map data may information defining one or more sections of a vehicle dealer lot, such as sections associated with different types of vehicles. As noted above, the polygon map data may define one or more polygons representing vehicle dealer lots (or parts thereof) in detail. Such polygon map data and corresponding polygon representations of vehicle dealer lot areas facilitate particularly advantageous analysis of the location data. Without such polygon map data, location data obtained from the user mobile devices only indicates proximity to a vehicle dealer lot (i.e., within a radius of a point somewhere on the vehicle dealer lot) or other area of interest, rather than actual presence on the lot. Such radius-based proximity data does not distinguish between location data corresponding to users who are on the dealer lot and location data corresponding to users who are off the dealer lot. Vehicle dealer lots and other areas of interest are rarely circular, typically being rectangular or irregular shapes. While lot proximity may be sufficient for some purposes, the polygon map data (or an equivalent thereof) may be used to define the contours or boundaries of the area of interest (e.g., the vehicle dealer lot or section thereof) within the map area. Such polygon map data may likewise be used to determine with greater accuracy the user location relative to such areas of interest.

At block 406, the remote server may determine the user location coincides with a vehicle dealer lot to determine the user is located on the lot or in a section of the lot. The remote server may compare the user geospatial location indicated by a geospatial location indicator with the map data associated with one or more vehicle dealer lots to determine whether the user is on one of the lots. Where the vehicle dealer lots are indicated by a set of coordinates in the map data (e.g., indicated by a point and radius or by a box defined by a range of latitude and longitude coordinates), for example, the remote server may compare the coordinates of the user geospatial location with the set of coordinates to determine whether the user geospatial location coordinates are within the set of coordinates associated with a vehicle dealer lot. Where the vehicle dealer lots (or sections thereof) are indicated by a set of polygons, as another example, the remote server may compare the user geospatial location coordinates with the coordinates of each polygon until the remote server determines that the user geospatial location coordinates are within a polygon or all polygons have been determined not to include the user geospatial location coordinates. Because geospatial location coordinates typically represent an approximation of a physical location, the remote server may attempt to identify an overlap between a part of a range of coordinates within an error radius of a point indicated by the geospatial location indicator (e.g., within 5 meters or 10 meters of a point). When a match is found between a coordinate associated with the user geospatial location and a coordinate associated with a vehicle dealer lot, the remote server may determine that the user is located on the vehicle dealer lot (or in a particular section of the vehicle dealer lot).

At block 408, the remote server may identify a vehicle type associated with the vehicle dealer lot at which the user has been determined to be located. The vehicle type may be determined as a type associated with a presumed user interest based upon the user location on the vehicle dealer lot. If the location of the user in a particular section of the vehicle dealer lot has been determined, the vehicle type may be determined based upon vehicles located in the particular section of the lot. This may be particularly advantageous for large vehicle dealer lots having many types of vehicles. A vehicle type may indicate a make or manufacturer of a vehicle, a category of vehicle body type (e.g., van, SUV, sedan/coupe, convertible, pickup, minivan, or wagon/crossover), a category of vehicle use type (e.g., passenger, sport, cargo, or classic), a category based upon vehicle characteristics (e.g., economy, luxury, or electric/hybrid), a category of vehicle model year (e.g., new or used), or other information regarding categories of vehicles. In some embodiments, a plurality of vehicle types may be determined based upon the user geospatial location, which may include multiple vehicle types within a category or multiple categories of types (e.g., categories of new vehicles, luxury vehicles, and convertible vehicles). For example, the remote server may determine the vehicle type by accessing a database of information associated with vehicle dealer lots to determine all types of vehicles associated with an identified vehicle dealer lot. If sufficient data regarding vehicle types associated with sections of the identified vehicle dealer lot is available, the remote server may limit the vehicle type or types to those associated with the section of the lot where the user is located. If multiple user geospatial locations are identified for the user, the remote server may identify vehicle types associated with each of the identified locations.

At block 410, the remote server may identify other user interest data based upon the additional data obtained from the user mobile device. The additional user interest data may include additional vehicle types of interest to the user based upon vehicles or dealerships searched or viewed by the user in a mobile application or web browser. The additional vehicle types may be used to identify additional vehicle types of interest to the user or may be used to refine the vehicle types identified based upon the user geospatial location. Such additional vehicle types may be determined based upon dealer or vehicle page views, which may be extracted from data stored in the program memory of the user mobile device (e.g., data stored in cookies). Such other user interest data may be identified by reference to a user account, in some embodiments, while other embodiments may identify the other user interest data without reference to a user account for the user (or without even the existence of a user account for the user). In further embodiments, the other user interest data may include information associated with a region in which the user may be searching for a vehicle, such as a metropolitan area or a state. Such region may be identified from among a set of predefined regions based upon the geospatial location data. The other user interest data may include information useful in identifying the user or the recency of user interest. To this end, the other user interest data may include a user mobile device identifier used to identify the user mobile device (e.g., mobile computing device 110) associated with the user and with the obtained data. Similarly, the other user interest data may include a timestamp associated with the geospatial location data, which timestamp may be used to determine a user status as described further below.

At block 412, the remote server may generate a user data sheet associated with the user. The user data sheet may be generated based upon the obtained geospatial location data and additional data, as well as the information derived therefrom (i.e., the identified vehicle type and the identified other user interest data). The user data sheet may include information relevant to determining user interests for personalized message generation. For example, the user data sheet may include information such as a user mobile device identifier, a geospatial location identifier associated with the user location on a vehicle dealer lot, a timestamp associated with the geospatial location identifier, a vehicle dealer lot associated with the geospatial location identifier, a vehicle type associated with the vehicle dealer lot or associated with the additional data indicative of user interests, a user interest identifier indicative of user interests based upon user interactions with the user mobile device (such as another vehicle type), or any other user interest data indicating information relevant to generating personalized messages for the user. The user data sheet may likewise include a user status identifier indicating a category of user status based upon time elapsed since the user was last at a vehicle dealer lot, as discussed further below with respect to FIG. 5. The user data sheet may be generated by the remote server while the user is on the vehicle dealer lot or at a later time, in various embodiments, and the user data sheet may be stored in the database 146 or the program memory 144 of the remote server 140. The user data sheet may be updated or used in generating personalized electronic messages, as discussed further below.

Figure 5:
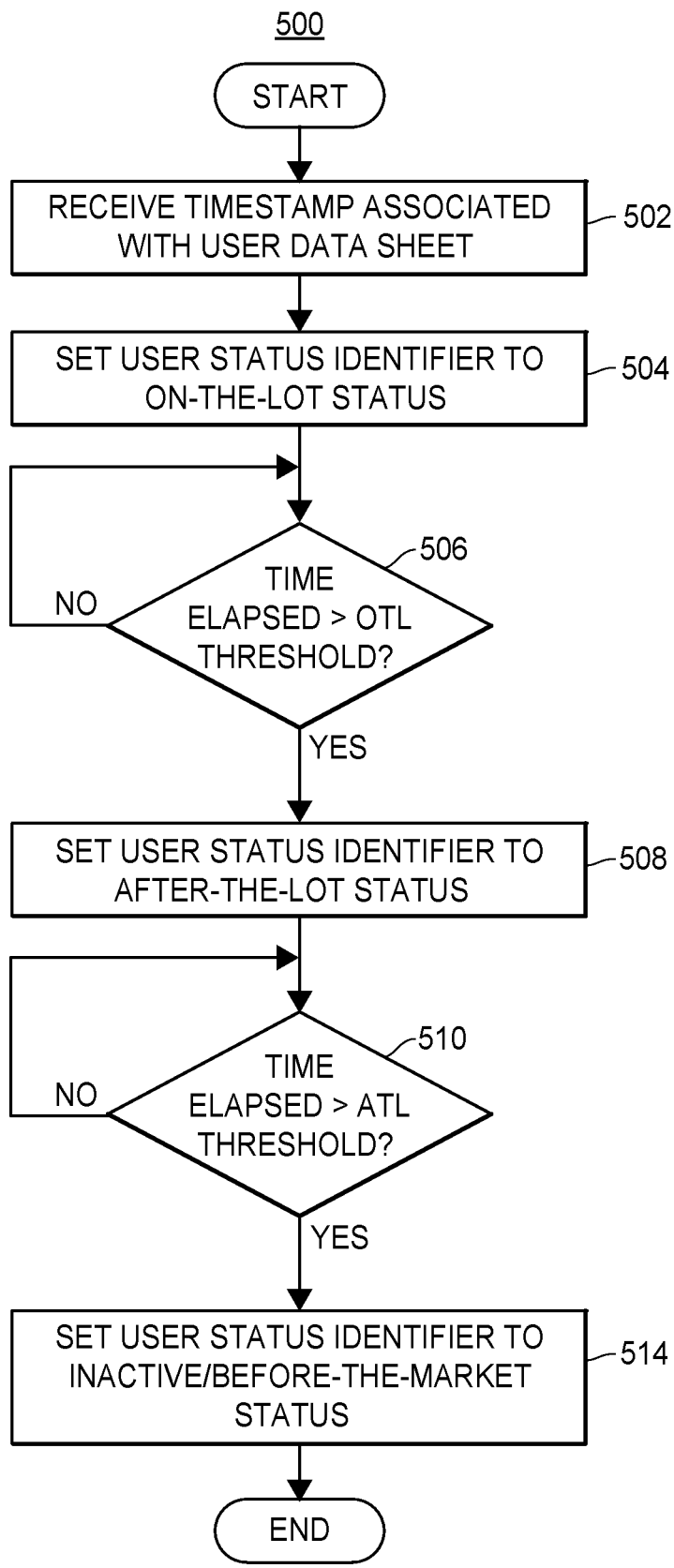
FIG. 5 illustrates a flow diagram of an exemplary user status identifier setting method for setting or updating a user status identifier in a user data sheet based upon time elapsed since the user mobile device was determined to be at a vehicle dealer lot.

FIG. 5 illustrates a flow diagram of an exemplary user status identifier setting method 500 for setting or updating a user status identifier in a user data sheet based upon time elapsed since the user mobile device was determined to be at a vehicle dealer lot. Because purchasing decisions are typically made shortly after visiting a vehicle dealer lot, the user status identifiers may be used to personalize user messages based upon how recently the user has been on a vehicle dealer lot. The method 500 may be implemented by the remote server periodically for user data sheets (e.g., daily for all current user data sheets) or episodically in response to a trigger event (e.g., when an electronic message is to be generated for the user). Alternatively, the method 500 may implement continuously from the time the user data sheet is generated until the user data sheet is set to inactive or deleted. Although the method 500 is discussed as setting user status indicators indicative of user location on a vehicle dealer lot, in further embodiments the user status indicators may additionally or alternatively indicate user interaction with vehicle or vehicle dealer information from a remote server, such as through accessing a web site or running a mobile application using the user mobile device.

The method 500 may begin with receiving a timestamp associated with the user data sheet (block 502), such as a timestamp of the user geospatial location data indicating a time the user was physically located at the vehicle dealer lot. The user status identifier may be set to an on-the-lot (OTL) status indicating (block 504), indicating current or recent user activity. The user status identifier remains set to OTL status until the time elapsed since the timestamp exceeds the OTL threshold duration (block 506), at which point the user status identifier is updated to an after-the-lot (ATL) status (block 508). The user status then remains set to the ATL status until the time elapsed since the timestamp exceed the longer ATL threshold duration (block 510). After reaching the ATL threshold duration, the user status identifier is set to an inactive or before-the-market (BTL) status (block 512), indicating the user has not recently been on a vehicle dealer lot.

At block 502, the remote server may receive the timestamp associated with the user data sheet. The timestamp may be received by accessing the timestamp stored in an existing user data sheet or may be obtained based upon the geospatial location data received from the user mobile device. In some embodiments, the timestamp may be generated by the remote server based upon the time the geospatial location data is received by the remote server from the user mobile device. In further embodiments, the timestamp may be indicative of the time the user data sheet was originally generated by the remote server, which may approximate the time the user was located at a vehicle dealer lot in embodiments in which the user data sheet is generated immediately upon obtaining data indicating the user is at a vehicle dealer lot. The timestamp may be stored in the user data sheet to enable the remote server to determine the user status for the user data sheet without reference to additional data.

At block 504, the remote server may set the user status identifier to a first status indicative of current or recent activity, viz. the on-the-lot (OTL) status. The OTL status may be indicative of the user currently being located on a vehicle dealer lot or having recently been located on a vehicle dealer lot. The user status identifier may be stored in the user data sheet as a single entry or may be stored as a set of entries or data fields associated with different status categories (e.g., OTL, ATL, and BTL fields).

At block 506, the remote server may compare the current system time with the timestamp to determine whether the time elapsed since the time indicated by the timestamp has exceeded a first threshold duration, viz. the OTL threshold duration. The OTL threshold duration may be a short period (e.g., one day) during which the user has just prior been on the vehicle dealer lot. In some embodiments, the OTL threshold duration may be a variable period, such that the user is identified as having the OTL status during the day on which they visited the vehicle dealer lot, in which case the OTL threshold duration may be exceeded at midnight in the relevant time zone. If the elapsed time has not exceeded the OTL threshold duration, the user status indicator may remain set to OTL status. If the elapsed time has exceeded the OTL threshold duration, the remote server may update the user status identifier at block 508. At block 508, the remote server may update the user status identifier to indicate a category of user status following the OTL status by setting the user status identifier to after-the-lot (ATL) status. The ATL status may indicate the user has been determined to have been on a vehicle dealer lot within a relevant period (e.g., within the past ten days) but is not currently on a vehicle dealer lot (or within the short OTL threshold duration immediately following being on a lot).

At block 508, the remote server may compare the current system time with the timestamp to determine whether the time elapsed since the time indicated by the timestamp has exceeded a second threshold duration, viz. the ATL threshold duration, which is longer that the OTL threshold duration. The ATL threshold duration may be a period typically associated with a user purchase decision following a visit to a vehicle dealer lot, such as a week or tend days. Because most users decide whether to make a purchase or not to make a purchase within such ATL threshold duration, the ATL status may indicate the user is considering whether to purchase a vehicle. As with the OTL threshold duration, the ATL threshold duration may be a fixed period or may be variable (e.g., a number of whole days following a user visit to a vehicle dealer lot). If the elapsed time has not exceeded the ATL threshold duration, the user status indicator may remain set to ATL status. If the elapsed time has exceeded the ATL threshold duration, the remote server may update the user status identifier at block 512. At block 512, the remote server may update the user status identifier to indicate a category of user status following the ATL status by setting the user status identifier to an inactive or before-the-lot (BTL) status. Such user may be considered to be in a BLT status with respect to a hypothetical future visit to a vehicle dealer lot, at which point the process may begin again. In some embodiments, the remote server may delete the user data sheet or mark the user data sheet for deletion determining the elapsed time has exceeded the ATL threshold duration, in which case setting the user status identifier may be implicitly accomplished by deletion of the user data sheet. Once the user status has reached the inactive or BTL status, the method 500 may terminate.

Figure 6:
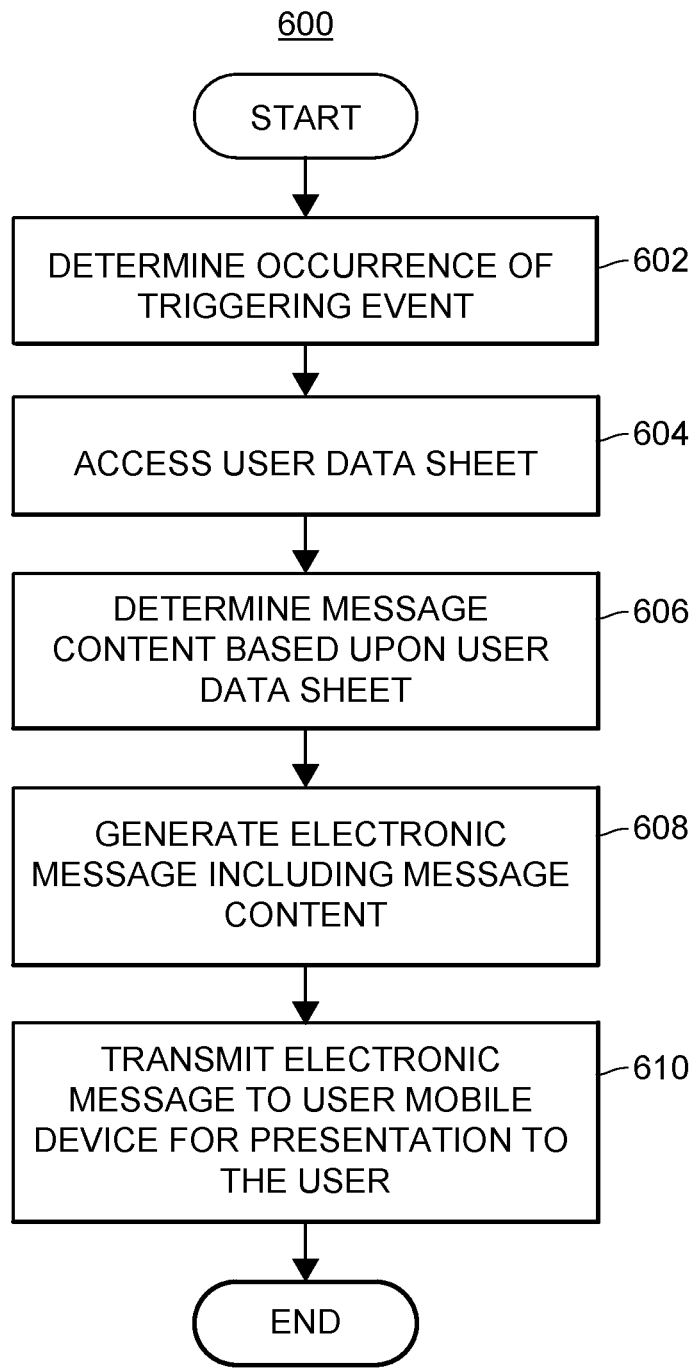
FIG. 6 illustrates a flow diagram of an exemplary personalized message generation method 600 for generating user-personalized electronic messages based upon information in a user data sheet.

FIG. 6 illustrates a flow diagram of an exemplary personalized message generation method 600 for generating user-personalized electronic messages based upon information in a user data sheet. The method 600 may be performed by the remote server any number of times after generation of the user data sheet, upon the occurrence of events that trigger the generation of electronic messages to the user. By accessing the information in the user data sheet, the remote server may generate messages that are personalized to be more useful or relevant to the user, without needing access to information specifically identifying the user or information beyond the data automatically collected or generated. Thus, the personalized message generation method 600 can generate higher-quality electronic messages based upon limited and automatically generated data.

The method 600 may begin with a determination of the occurrence of a triggering event (block 602), such as a user mobile device requesting a web page associated with a vehicle or vehicle dealer. The remote server may then access a user data sheet associated with the user mobile device (block 604) and determine personalized message content based upon the information in the user data sheet (block 606). The message content determined by the remote server may then be used to generate an electronic message (block 608), which may then be transmitted to the user mobile device for presentation to the user (block 610).

At block 602, the remote server may determine the occurrence of a triggering event for generating an electronic message for the user. The triggering event may include determining the user is located at a vehicle dealer lot or is interacting with data regarding vehicles or vehicle dealers using the user mobile device. In some embodiments, the triggering event may occur when the remote server initially determines the user is located at a vehicle dealer lot, as discussed above. Alternatively, the triggering event may occur when the user is subsequently determined to be located at the same or a different vehicle dealer lot based upon additional geospatial location data received from the user mobile device. In further embodiments, the triggering event may occur when the user interacts with the user mobile device to obtain information from the remote server, such as by accessing a web site or requesting data through a mobile application. For example, the remote server (or an associated server) may receive from the user mobile device a request for a vehicle dealer page or a vehicle page containing information about a vehicle dealer or a specific vehicle. The receipt of such request may serve as a triggering event causing the remote server to generate an electronic message, which may be personalized for the user based upon a user mobile device identifier received at the remote server. In yet further embodiments, the triggering event may occur upon the passage of a certain time following generation of the user data sheet.

In some embodiments, the user may access information from the remote server in a plurality of user sessions, each user session being associated with accessing data from the remote server via a web browser or mobile application of the user mobile device. In some embodiments, user interaction with the remote server may be identified across multiple user sessions based upon a user mobile device identifier, without accessing user account information associated with the user. Thus, information from multiple user sessions may be combined without the need for the user to create or log into a user account associated with the remote server. The triggering event may occur during the same user session as a user request to access data regarding a vehicle or vehicle dealer or may occur during a subsequent user session, which subsequent user session may also include a request to access information regarding vehicles or vehicle dealers. For example, the user data sheet may be generated based upon geospatial location data and additional data received during a first user session, then later determine the occurrence of a triggering event during a second user session. The user data sheet may be generated by the remote server during or following the first user session, and in either case prior to the second user session. The occurrence of the triggering event in the second user session may then cause the remote server to determine message content for the personalized user, generate an electronic message including the message content, and transmit the electronic message to the user mobile device for presentation to the user.

At block 604, the remote server may access the user data sheet associated with the user. To identify the associated user data sheet, the remote server may identify a user mobile device identifier received from the user mobile device as a unique device ID in electronic communication between the user mobile device and the remote server. Such user mobile device identifier may be generally associated with the device itself or may include a user mobile device identifier previously stored in a memory of the user mobile device, such as in a cookie store in the data storage 222 of the mobile computing device 110. The remote server may then search the stored user data sheets to identify a user data sheet having a user mobile device identifier that matches the received user mobile device identifier. In some embodiments, the remote server may determine whether to set or update a user status identifier in the user data sheet (as discussed above) when accessing the user data sheet.

At block 606, the remote server may determine message content for an electronic message to be sent to the user. The remote server may select or algorithmically generate one or more message content items based upon the information stored in the user data sheet. Such message content items may include information regarding a particular vehicle or vehicle dealer that may be of interest to the user, pricing or availability information related to particular vehicles or types of vehicles, trade-in offers or other incentives offered by vehicle dealers, locations or hours of operation of nearby vehicle dealers, or other information relating to vehicles or vehicle dealers associated with user interests as identified based upon the information stored in the user data sheet. For example, the remote server may identify a vehicle of interest to the user based upon the vehicle type data stored in the user data sheet, which may include identifying one or more vehicles of the vehicle type located at a vehicle dealer lot associated with the user geospatial location received from the user mobile device or other nearby vehicle dealer lots (such as associated lots). In some embodiments, the message content may include a text, image, or video advertisement for a vehicle, vehicle make, or vehicle dealer. For example, the message content may include an advertisement to display on a web page requested by the user mobile device. Similarly, the remote server may identify a vehicle of interest to the user based upon a user interest identifier stored in the user data sheet and indicating interest in another vehicle type.

In further embodiments, the message content may be determined based at least in part upon the user status identifier stored in the user data sheet. For example, the message content selected for a user having OTL status set in the user status identifier may be more closely associated with vehicles available at the vehicle dealer lot where the user mobile device is or was located. Such message content for an on-the-lot user may include information regarding vehicles available at the vehicle dealer lot or information regarding the same vehicles available at another vehicle dealer lot. In contrast, message content selected for a user having ATL status set in the user status identifier may be more generally associated with types of vehicles associated with the vehicle dealer lot, on the assumption that the user is less interested in the particular vehicles available at the vehicle dealer lot after a certain amount of time has elapsed and the user is still searching for a vehicle to purchase. In still further embodiments, the remote server may determine the message content based upon the information in the user data sheet and the information requested by the user mobile device in a data request that serves as the triggering event for message generation. For example, the message content may be refined based upon vehicle types associated with a vehicle dealer lot the user visited and a vehicle type of a vehicle the user is currently reviewing via the user mobile device.

At block 608, the remote server may generate an electronic message personalized for the user by including the determined message content. The personalized electronic message may be generated as information to be included with other information being sent to the user mobile device (e.g., such as vehicle information responsive to a request from the user mobile device) or a separate message to be transmitted to the user mobile device. In some embodiments, the electronic message may be an e-mail message, a text message, an advertisement for presentation on a web page or within a mobile application, or content to insert into a web page or within a display of a mobile application. In some embodiments, the electronic message may include a link to further information associated with the presented information, such as a link to a vehicle dealer page. When generated, the electronic message may be sent to the user mobile device for presentation to the user.

At block 610, the remote server may transmit the generated electronic message to the user mobile device for presentation to the user. The electronic message may be transmitted via the network 130 from the remote server to the user mobile device. Upon receiving the electronic message, the user mobile device may execute instructions included in the electronic message that cause at least a portion of the message content to be presented to the user via a display 202 of the user mobile device. The method 600 may then terminate.

Other Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in various exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein any reference to "one embodiment," "an embodiment," or "some embodiments" means that a particular element, feature, structure, or characteristic described in connection with the embodiment or embodiment is included in at least one embodiment. The appearances of the phrases "in one embodiment" or "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for systems and methods utilizing the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods, devices, and systems disclosed herein without departing from the spirit and scope defined in the appended claims.

Although the foregoing text sets forth a detailed description of numerous different embodiments, it should be understood that the legal scope of the invention is defined by the words of the claims set forth at the end of this patent. The particular features, structures, or characteristics of any specific embodiment may be combined in any suitable manner and in any suitable combination with one or more other embodiments, including the use of selected features without corresponding use of other features. It is to be understood that other variations and modifications of the embodiments of the present invention described and illustrated herein are possible in light of the teachings herein and are to be considered part of the spirit and scope of the present invention. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A computer-implemented method for generating user-personalized messages, comprising:
    accessing, at a user mobile device via a communication network, information associated with one or more vehicles or vehicle dealers;
    obtaining, by a geolocation unit of the user mobile device, a geospatial location identifier indicating a geospatial location of the user mobile device in response to accessing the information;
    transmitting, from the user mobile device to a server via the communication network, the geospatial location identifier and a user mobile device identifier;
    accessing, by one or more processors of the server, map data associated with a vehicle dealer lot in proximity to the identified geospatial location of the user mobile device, wherein the map data includes a set of data defining a lot area of the vehicle dealer lot as one or more polygons within a map area;
    determining, by the one or more processors of the server, that the user mobile device is located on the vehicle dealer lot by comparing the geospatial location identifier with the map data to determine the geospatial location identifier is within the one or more polygons defining the lot area;
    determining, by the one or more processors of the server, a vehicle type associated with a user interest based upon the vehicle dealer lot;
    generating, by the one or more processors of the server, a user data sheet including (i) a timestamp associated with the geospatial location identifier, (ii) the user mobile device identifier, (iii) the vehicle type, and (iv) a user status identifier indicating a category of user status based upon time elapsed since a time indicated by the timestamp, wherein the user status identifier is set to a first status indicating current or recent user activity;
    determining, by the one or more processors of the server, a time elapsed since the time indicated by the timestamp has exceeded a first threshold duration;
    updating, by the one or more processors of the server, the user status identifier to a second status indicating the user was recently on the vehicle dealer lot but is no longer on the vehicle dealer lot based upon the time elapsed exceeding the first threshold duration but not exceeding a second threshold duration;
    determining, by the one or more processors of the server, a message content for presentation to a user of the user mobile device based upon at least the user status identifier of the user data sheet indicating the user was recently on the vehicle dealer lot but is no longer on the vehicle dealer lot;
    transmitting, from the server to the mobile user device via the communication network, an electronic message including the message content; and
    presenting, by a display of the user mobile device, the message content to the user.

2. The computer-implemented method of claim 1, further comprising:
    determining, by the one or more processors of the server, the user mobile device is located in a section of the vehicle dealer lot based upon the one or more polygons within the map area,
    wherein determining the vehicle type includes determining one or more types of vehicles associated with the section of the vehicle dealer lot.

3. The computer-implemented method of claim 1, further comprising:
    determining, by the one or more processors of the server, the time elapsed since the time indicated by the timestamp has exceeded the second threshold longer than the first threshold duration; and
    updating, by the one or more processors of the server, the user status identifier to indicate a third category of user status based upon the time elapsed since the time indicated by the timestamp being determined to have exceeded the second threshold duration, wherein the third user category indicates an inactive status.

4. The computer-implemented method of claim 1, wherein:
    the information accessed at the user mobile device is associated with a second vehicle type;
    the user data sheet further includes a user interest identifier indicating interest of the user in the second vehicle type determined based upon the information accessed at the user mobile device; and
    determining the message content includes determining the message content based at least in part upon the user interest identifier.

5. The computer-implemented method of claim 1, wherein determining the message content based upon the user data sheet includes identifying a vehicle of the vehicle type located at the vehicle dealer lot or an associated vehicle dealer lot.

6. The computer-implemented method of claim 1, wherein:
    the information associated with the one or more vehicles or vehicle dealers is accessed at the user mobile device during a first user session associated with use of a mobile application or web site;

transmitting the electronic message including the message content occurs during a second user session associated with use of the mobile application or web site; and the user data sheet is generated by the one or more processors of the server prior to the second user session.

7. The computer-implemented method of claim 6, wherein determining the message content occurs during the second user session based in part upon the user mobile device identifier and without accessing user account information associated with the user.

8. A computer system for generating user-personalized messages, comprising:

one or more processors;

a communication module adapted to communicate data via a communication network;

a program memory coupled to the one or more processors and storing executable instructions that when executed by the one or more processors cause the computer system to:

provide information associated with one or more vehicles or vehicle dealers to a user mobile device in response to a data request from the user mobile device using the communication module;

cause the user mobile device to obtain and transmit via the communication network a geospatial location identifier indicating a geospatial location of the user mobile device, wherein the geospatial location identifier is generated by the mobile device;

receive the geospatial location identifier and a user mobile device identifier from the user mobile device using the communication module;

access map data associated with a vehicle dealer lot in proximity to the identified geospatial location of the user mobile device, wherein the map data includes a set of data defining a lot area of the vehicle dealer lot as one or more polygons within a map area;

determine that the user mobile device is located on the vehicle dealer lot by comparing the geospatial location identifier with the map data to determine the geospatial location identifier is within the one or more polygons defining the lot area;

determine a vehicle type associated with a user interest based upon the vehicle dealer lot;

generate a user data sheet including (i) a timestamp associated with the geospatial location identifier, (ii) the user mobile device identifier, (iii) the vehicle type, and (iv) a user status identifier indicating a category of user status based upon time elapsed since a time indicated by the timestamp, wherein the user status identifier is set to a first status indicating current or recent user activity;

determine a time elapsed since the time indicated by the timestamp has exceeded a first threshold duration;

update the user status identifier to a second status indicating the user was recently on the vehicle dealer lot but is no longer on the vehicle dealer lot based upon the time elapsed exceeding the first threshold duration but not exceeding a second threshold duration;

determine a message content for presentation to a user of the user mobile device based upon at least the user status identifier of the user data sheet indicating the user was recently on the vehicle dealer lot but is no longer on the vehicle dealer lot;

transmit an electronic message including the message content to the user mobile device using the communication module; and cause the user mobile device to present the message content to the user via a display of the user mobile device.

9. The computer system of claim 8, wherein the executable instructions further cause the computer system to:

determine the time elapsed since the time indicated by the timestamp has exceeded the second threshold duration longer than the first threshold duration; and update the user status identifier to indicate a third category of user status based upon the time elapsed since the time indicated by the timestamp being determined to have exceeded the second threshold duration, wherein the third user category indicates an inactive status.

10. The computer system of claim 8, wherein the executable instructions cause the computer system to:

provide the information to the user mobile device in response to the data request during a first user session associated with use of a mobile application or web site;

generate the user data sheet prior to a second user session associated with use of the mobile application or web site;

determine the message content during the second user session based in part upon the user mobile device identifier and without accessing user account information associated with the user; and transmit the electronic message including the message content during the second user session.

11. A tangible, non-transitory computer-readable medium storing executable instructions for generating user-personalized messages that, when executed by one or more processors of a computer system, cause the computer system to:

provide information associated with one or more vehicles or vehicle dealers to a user mobile device in response to a data request from the user mobile device via a communication network;

cause the user mobile device to obtain and transmit via the communication network a geospatial location identifier indicating a geospatial location of the user mobile device, wherein the geospatial location identifier is generated by the mobile device;

receive the geospatial location identifier and a user mobile device identifier from the user mobile device via the communication network;

access map data associated with a vehicle dealer lot in proximity to the identified geospatial location of the user mobile device, wherein the map data includes a set of data defining a lot area of the vehicle dealer lot as one or more polygons within a map area;

determine that the user mobile device is located on the vehicle dealer lot by comparing the geospatial location identifier with the map data to determine the geospatial location identifier is within the one or more polygons defining the lot area;

determine a vehicle type associated with a user interest based upon the vehicle dealer lot;

generate a user data sheet including (i) a timestamp associated with the geospatial location identifier, (ii) the user mobile device identifier, (iii) the vehicle type, and (iv) a user status identifier indicating a category of user status based upon time elapsed since a time indicated by the timestamp, wherein the user status identifier is set to a first status indicating current or recent user activity;

determine a time elapsed since the time indicated by the timestamp has exceeded a first threshold duration;

update the user status identifier to a second status indicating the user was recently on the vehicle dealer lot but is no longer on the vehicle dealer lot based upon the time elapsed exceeding the first threshold duration but not exceeding a second threshold duration;

determine a message content for presentation to a user of the user mobile device based upon at least the user status identifier of the user data sheet indicating the user was recently on the vehicle dealer lot but is no longer on the vehicle dealer lot;

transmit an electronic message including the message content to the user mobile device via the communication network; and cause the user mobile device to present the message content to the user via a display of the user mobile device.

12. The tangible, non-transitory computer-readable medium of claim 11, wherein the executable instructions further cause the computer system to:

determine the time elapsed since the time indicated by the timestamp has exceeded the second threshold duration longer than the first threshold duration; and update the user status identifier to indicate a third category of user status based upon the time elapsed since the time indicated by the timestamp being determined to have exceeded the second threshold duration, wherein the third user category indicates an inactive status.

13. The tangible, non-transitory computer-readable medium of claim 11, wherein the executable instructions cause the computer system to:

provide the information to the user mobile device in response to the data request during a first user session associated with use of a mobile application or web site;

generate the user data sheet prior to a second user session associated with use of the mobile application or web site;

determine the message content during the second user session based in part upon the user mobile device identifier and without accessing user account information associated with the user; and transmit the electronic message including the message content during the second user session.

* * * * *